(12) United States Patent
Fornes et al.

(10) Patent No.: US 7,721,828 B2
(45) Date of Patent: May 25, 2010

(54) STEERING ADJUSTMENT SCREW RETAINER

(75) Inventors: Corey L. Fornes, Lisbon, ND (US); Michael Paul Langseth, Fargo, ND (US)

(73) Assignee: Clark Equipment Company, West Fargo, ND (US)

( * ) Notice: Subject to any disclaimer, the term of this patent is extended or adjusted under 35 U.S.C. 154(b) by 561 days.

(21) Appl. No.: 11/567,278

(22) Filed: Dec. 6, 2006

(65) Prior Publication Data

US 2008/0135311 A1 Jun. 12, 2008

(51) Int. Cl.
*B62D 11/00* (2006.01)
*G05G 1/04* (2006.01)

(52) U.S. Cl. ............ 180/6.48; 180/333; 180/336; 74/526; 74/527

(58) Field of Classification Search ............ 180/6.48, 180/333, 336; 74/526, 527
See application file for complete search history.

(56) References Cited

U.S. PATENT DOCUMENTS

| | | | |
|---|---|---|---|
| 586,024 A | 7/1897 | Gabriel | |
| 2,202,053 A | 5/1940 | Helmond | |
| 2,281,056 A | 4/1942 | Tinnerman | |
| 2,378,684 A | 6/1945 | Calstrom | |
| 2,381,936 A | 8/1945 | Sargent, Jr. | |
| 2,425,228 A | 8/1947 | Bloomfield et al. | |
| 3,030,997 A | 4/1962 | Collins | |
| 3,365,997 A | 1/1968 | Price | |
| 3,792,744 A | 2/1974 | Gray | |
| 4,955,772 A * | 9/1990 | Reck | 411/175 |
| 5,423,646 A | 6/1995 | Gagnon | |
| 6,161,637 A * | 12/2000 | Decker et al. | 180/6.48 |
| 6,830,111 B2 * | 12/2004 | Page | 172/42 |
| 6,854,946 B2 * | 2/2005 | Bauer | 411/523 |
| 6,942,047 B2 | 8/2005 | Radu et al. | |
| D582,262 S * | 12/2008 | Kudo | D8/382 |
| 2003/0042737 A1 | 3/2003 | Sampson | |
| 2003/0234131 A1 | 12/2003 | Woytassek | |

FOREIGN PATENT DOCUMENTS

| EP | 0 083 519 A1 | 7/1983 |
|---|---|---|
| FR | 2 796 427 | 1/2004 |

OTHER PUBLICATIONS

John Deere Tractors 8430 and 8630 repair manual, pp. 35-7 through 35-10, Feb. 1979.
European Search Report dated Feb. 22, 2008 from European patent application No. 07 12 1208.

* cited by examiner

*Primary Examiner*—Lesley Morris
*Assistant Examiner*—Marlon A Arce
(74) *Attorney, Agent, or Firm*—John D. Veldhuis-Kroeze; Westman, Champlin & Kelly, P.A.

(57) ABSTRACT

A retaining strip arranged to impede the rotation of a stop screw is disclosed. The retaining strip connects with the stop screw on both sides of an attachment bracket. The retaining strip is stretched over the bracket and applies a pressure to the screw that serves to maintain screw rotational position during vehicle operation. The retaining strip does not hamper the adjustment of the screw during adjustment.

11 Claims, 7 Drawing Sheets

STEERING ADJUSTMENT SCREW RETAINER

BACKGROUND

The present invention relates to an adjustment to match the speed of rotation of drive wheels on opposite sides of a skid steer vehicle or loader when the conventional steering levers are in full forward speed drive positions. An adjustable stop for adjusting the maximum forward speed position for the drive control for the drive motor for one side of the vehicle is accessible from the interior of the loader cab to permit manual, easy adjustments. When both drive controls are in the maximum forward speed position the speed of the drive on each side of the skid steer loader is matched, and the loader will go straight forwardly.

The conventional hydrostatic drive systems on skid steer loaders have long been operated by a pair of levers in the cab that move forward and back from a neutral position. The levers rotate bellcranks over a mounted shaft. These bellcranks connect to links leading to separate pump controls for pumps/motors on opposite sides of the loader.

U.S. Pat. No. 4,090,411 illustrates such a drive system, utilizing a self centering control. The steering levers are individually mounted and movable, and one lever controls the drive motor direction and speed on the right hand side of the vehicle, and the other lever controls the drive motor direction and speed on the left hand side of the vehicle. At present, the conventional skid steer lever arrangement does not permit quickly accessible adjustment for setting and matching the speeds of the motors on opposite sides of the loader at a full forward speed position of both of the steering levers.

SUMMARY

The present disclosure relates to a simplified adjustable stop and retainer for at least one of the drive control and steering levers for a skid steer vehicle which permits the operator to adjust a stopped position of the lever at the full forward speed position. The vehicle drive comprises hydraulic or hydrostatic motors on the opposite sides of the vehicle and by adjusting the full speed position of one control, the speed of the motor controlled by the one lever can be matched in speed to the motor controlled by the other lever. By this adjustment, an operator can assure that the skid steer vehicle will not tend to veer from a straight line when traveling forwardly at full speed.

Since the adjustment is easily accessible, the adjustment can be made easily during operations if any tendency to drift one way or the other is noted. Further, the retaining strip helps prevent the accidental movement of the stop screw due to vibrations that occur during the operation of the vehicle.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
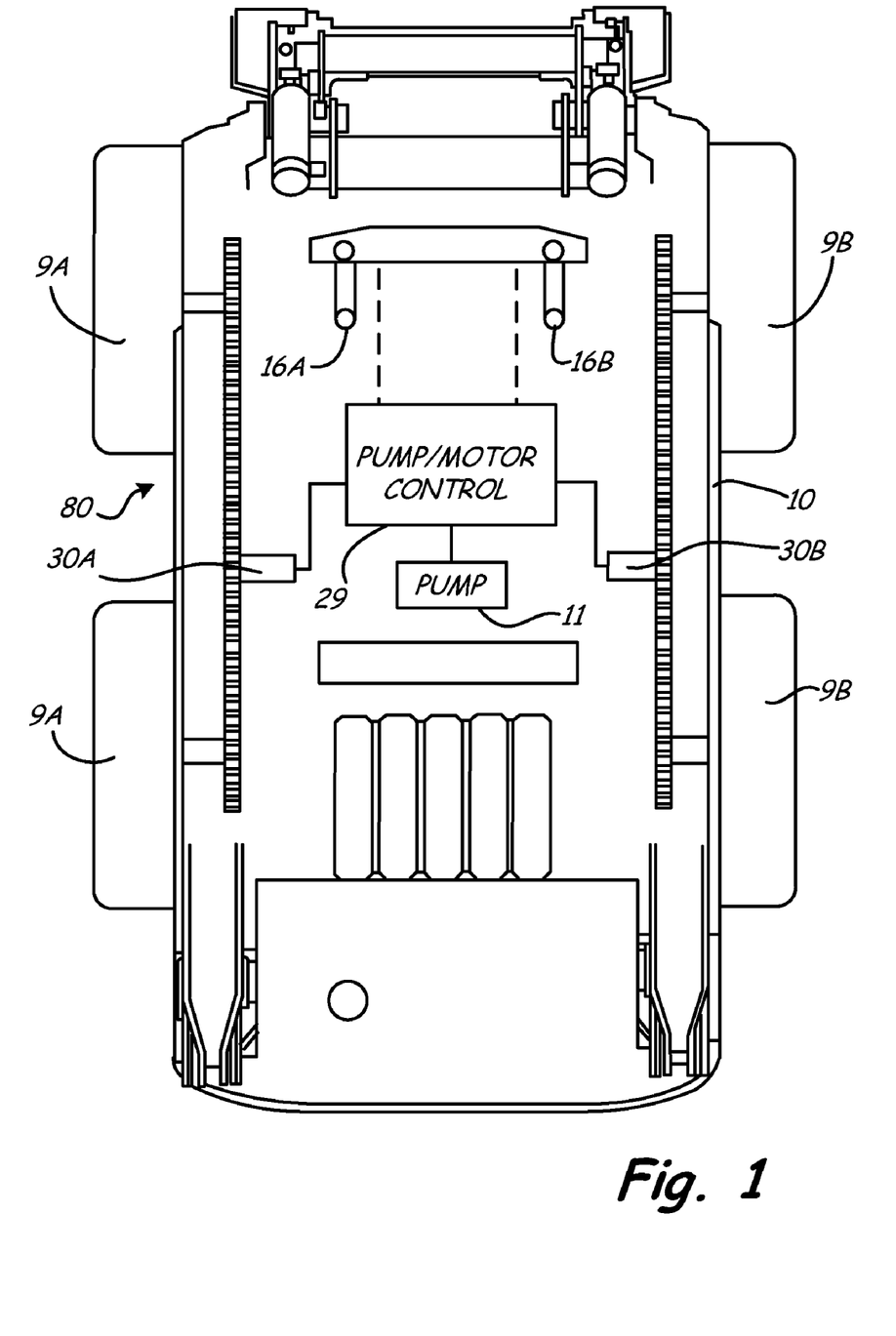
FIG. 1 is a top view of a skid steer loader schematically showing the control lever and drive.
Figure 2:
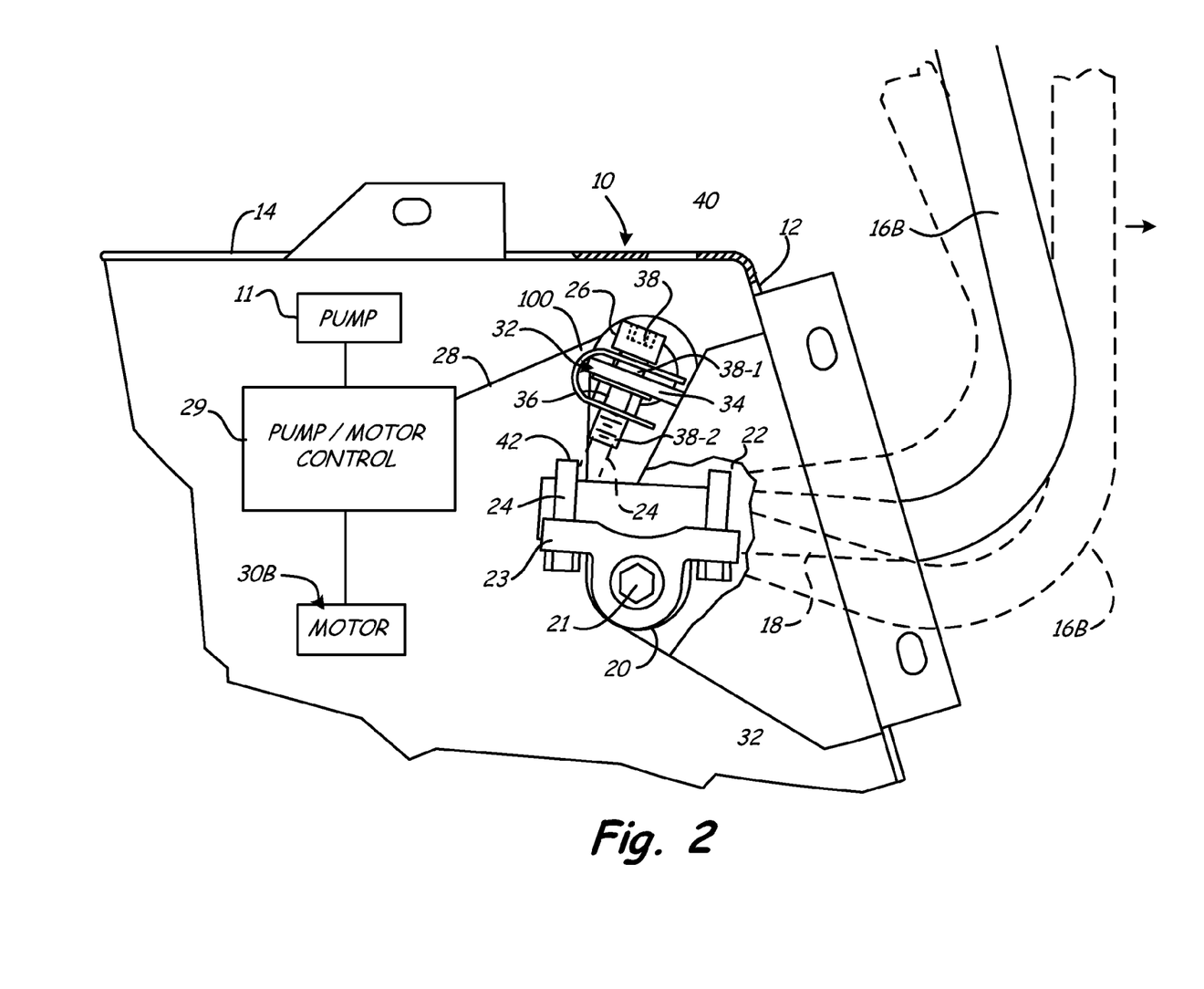
FIG. 2 is a fragmentary schematic side elevational sectional view showing a typical steering lever mounting on a bellcrank that pivots on a shaft, and including a stop for adjusting the position of the lever according to the disclosed embodiments.

The use of a pair of control levers for controlling movement of skid steer loaders is well known. FIGS. 1 and 2 show, respectively, a skid steer vehicle comprising a loader 80 as shown and described, having wheels driven in pairs, including the pair of left side wheels 9A and the pair of right side wheels 9B. The loader 80 has a frame 10 that supports an engine for power to drive a pump 11 for providing fluid under pressure to the controllable drive motors and other components.

The drive control lever or sticks 16A and 16B are pivotally mounted on shafts below the operator's or cab platform 12, and extend into the cab. Each side of the loader is driven through a separate flow controlled, variable speed (swash plate) motor 30A and 30B. The speed of motors 30A and 30B is dependent upon the position of the respective steering levers. As can be seen, motor 30A drives both of the wheels 9A simultaneously and motor 30B drives both wheels 9B simultaneously.

In a neutral position of the levers 16A and 16B, the loader is stopped. Moving the levers 16A and 16B forward results in forward movement, with the speed of the controlled motor being proportional to the lever movement. When the levers 16A and 16B are both fully forward, maximum forward speed is achieved. The speed of the motors 30A and 30B should match each other to keep the loader traveling straight.

The schematic showing of FIG. 2 is a fragmentary side view of a portion of the skid steer loader frame 10 that shows a front portion of platform 12 forming part of the frame, with an operator seat area 14 to the rear of the front portion of the platform. Control lever 16B is shown schematically, and it extends into the operator's cab, and is moved forward and rearward from a neutral position, in order to drive the controlled motor to propel the loader forward or rearward. The neutral position of lever 16B is substantially as shown in solid lines in FIG. 2.

The levers 16A and 16B also control the speed of the drive wheels on each side of the loader, and when going forwardly at the full forward position of the levers, it is important that the motors 30A and 30B are running at the same speed or else the loader will tend to "veer" or not run exactly straight.

Disclosed embodiments provide an adjustment of the full forward position of one control lever, so that it can be "tweaked" or otherwise adjusted to ensure that the drive speed of the motors on each side of the loader at full forward control lever stroke of both levers will be exactly the same. Both levers 16A and 16B can have the adjustable stop arrangement, if desired.

The lever 16B shown in FIG. 2 has an arm portion 18, that is fastened to a saddle 23 which is part of bellcrank 20. This bellcrank rotates about mounting shaft 21 that is supported on the frame 10. The lever arm 18 is fastened to the saddle 23 with suitable U-bolts 22 and 24. The lever 16B pivots and rotates the bellcrank 20 about the axis of shaft 21 between the dotted line positions shown in FIG. 2. The solid line position of lever 16B is the neutral position. The bellcrank 20, as schematically shown will move a lever 26 that in turn is connected through a link 28 to pump/motor control 29 that adjusts a swash plate or variable speed drive pump/motor indicated at 30B. The pump/motor control 29 also is standard, and the showing in FIG. 2 is simplified.

As the steering lever 16B is pushed forwardly, to achieve a desired forward speed, the bellcrank 20 rotates in a clockwise direction as illustrated in FIG. 2, so that the end of U-bolt 24 tends to move in an arc toward the inner side of the forward portion of panel 12.

In the disclosed embodiments, an adjustment stop bracket 32 is fixed in position on the panel 12, and has a projecting end flange 34 that has an adjustment nut 36 welded or otherwise attached on the lower surface thereof. Prior to welding or otherwise attaching the nut 34 to the lower surface of the flange 36, the bracket 32 is in some embodiments painted. By painting the bracket 32 prior to assembly it enables the bracket to be more resilient to the elements. An adjustment screw 38 extends through the nut 36, and when the screw is threaded, it will move in and out along its axis.

Figure 3:
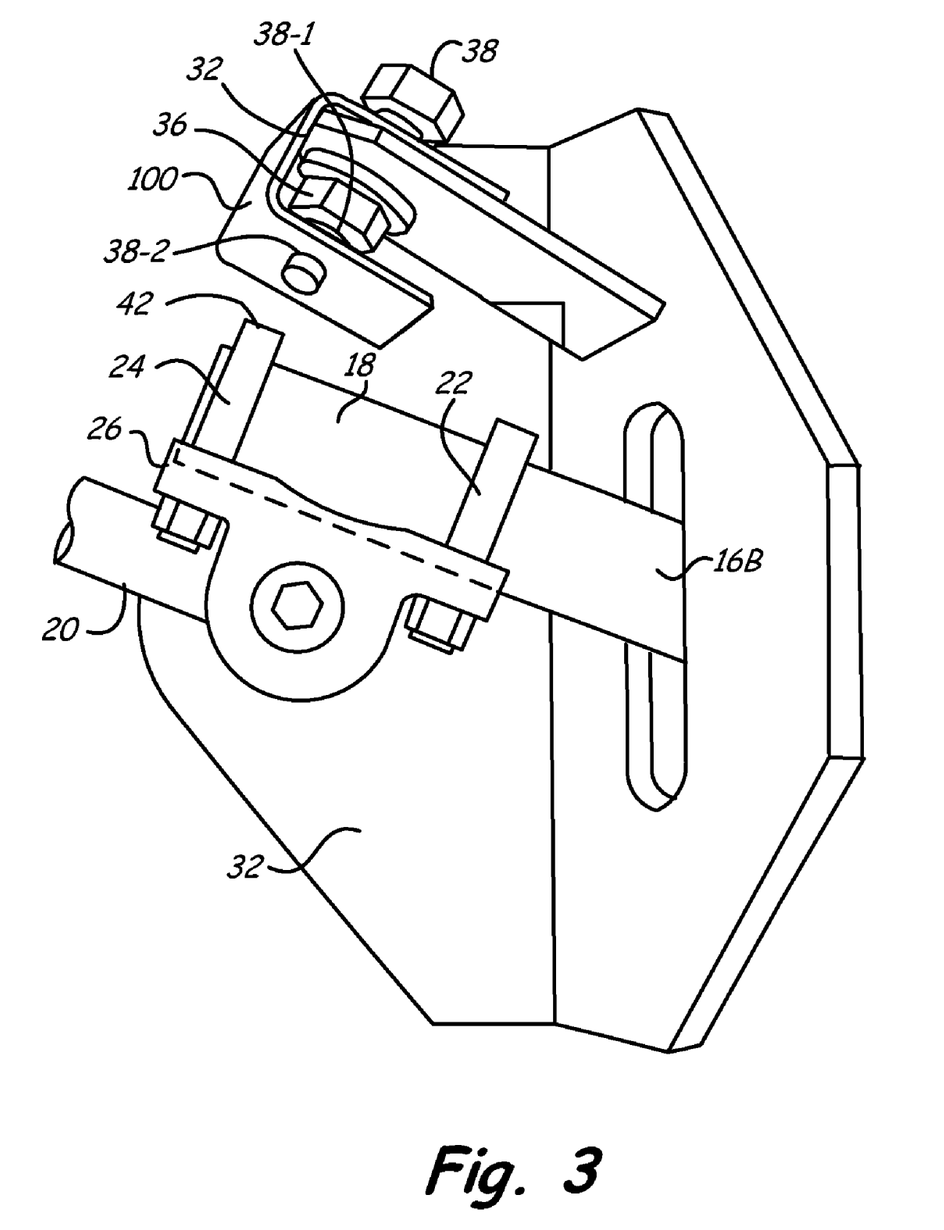
FIG. 3 is a close up view of the stop screw and retaining strip.
Figure 4:
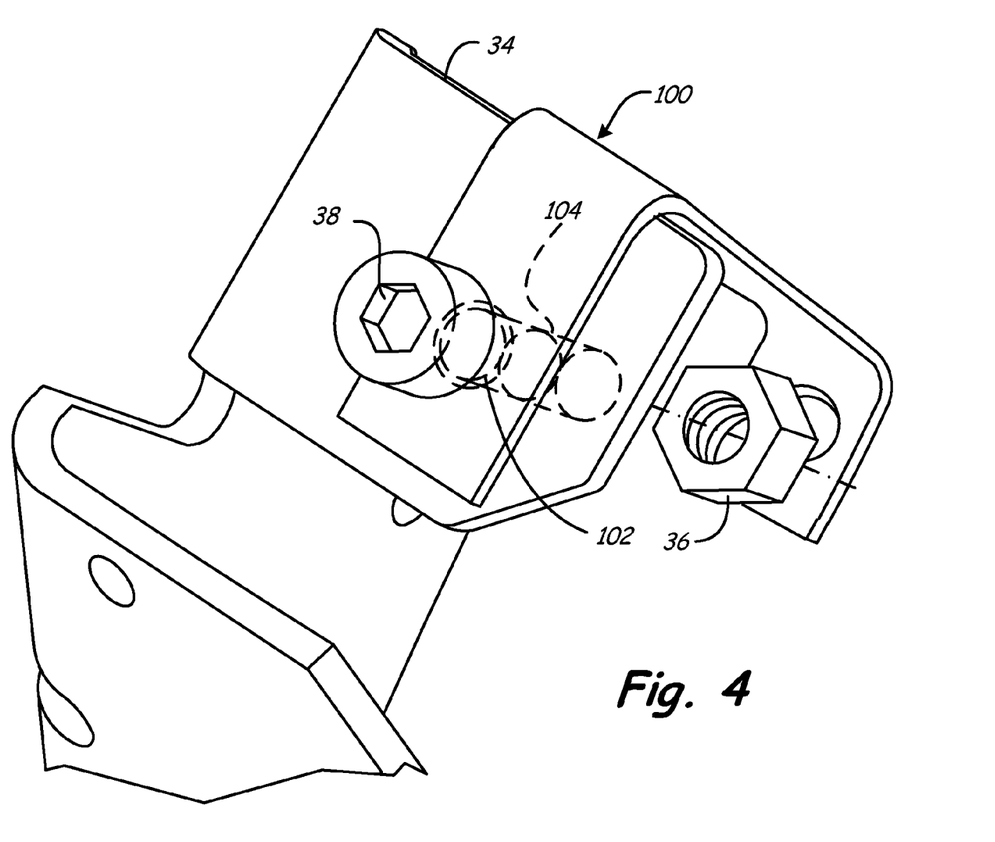
FIG. 4 is an exploded view of the stop screw, nut, bracket and retaining strip.

A rubber retaining strip 100 is placed on the screw 38 prior to the threading of the screw 38 into the bracket 32 and nut 34. The rubber strip 100 has two holes or apertures, 102, 104 (FIG. 4). Screw 38 is first pressed through hole 102. Then, the screw 38 is threaded in place. After the screw is threaded in place, the rubber strip 100 is placed over bracket 32 and is attached to the bottom portion of screw 38. This is achieved by placing the screw 38 through hole 104. Thus, in the assembled condition, hole 102 contacts a first portion 38-1 of screw 38, and hole 104 contacts a second portion 38-2 of screw 38, and the retaining strip 100 interfaces with both screw 38 and bracket 32. FIGS. 3 and 4 are close up views of the retaining strip 100. These figures illustrate the placement of strip 100 on the bracket 32.

With the rubber strip 100 in place over the bracket 32, the strip 100 imports a restraining force on the screw 38. In some embodiments, this retaining force is caused by stretching. However, other methods of imparting this restraining force can be used. This restraining force provides a force on screw 38 that inhibits the rotation of the screw due to vibrations. These vibrations are commonly associated with the movement of the vehicle over terrain, or the simple idling of the engine. However, the strip 100 does not provide sufficient force to prevent the adjustment of screw 38. In some embodiments the restraining strip 100 can be released from the stop screw prior to adjustment. This is achieved by taking the end associated with hole 104, and sliding it off of the stop screw. This releases the pressure on the bracket 32 and screw 38.

The size of the holes 102, 104 and the length of the strip 100 are determined by the properties of the rubber and the desired resistance to vibration. While strip 100 has been disclosed as being rubber, it can, in alternative embodiments, be made of other flexible materials. For example, it could be made of nylon or a flexible plastic.

The adjustment screw 38 is accessible through an opening 40 in the horizontal portion of platform 12, from the interior of the operator's cab so that the screw 38 can moved in and out.

Figure 5:
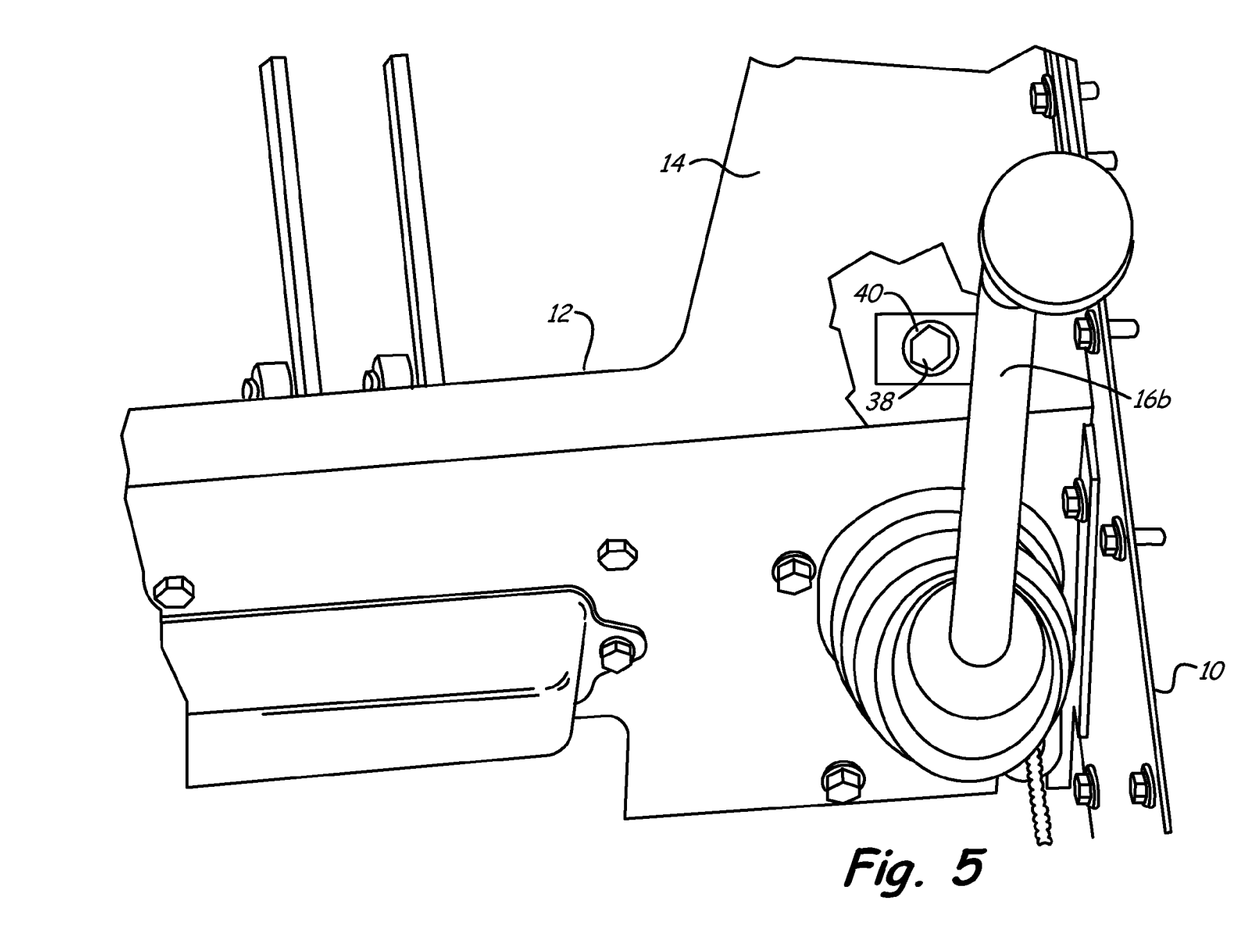
FIG. 5 is a perspective top view showing the steering panel of the cab of a skid steer loader and the access opening for the adjustable stop.

The end of the screw 38 aligns with a flat spot 42 on the top closed end of the U-bolt 24, when the steering lever 16B is pushed all the way forwardly as shown in dotted lines in FIGS. 2 and in FIG. 5. The stop bolt 38 will provide a stop against the flat spot 42 of the U-bolt 24 and stop movement of the lever 16B. The stop bolt 38 determines the pivoted position of the lever 16B and the link 28, and thus the position of the swash plate velocity control for the motor 30B. The speed of rotation of the drive motor 30B when the lever 16B is stopped in full forward position can be adjusted.

By driving the loader at the full forward speed positions of the levers 16A and 16B, it can immediately be noted if the wheels on opposite sides of the loader are at equal speeds. If not, one or both of the levers can be changed slightly in its stopped position to change the output speed of the drive pump/motor 30A or 30B for the respective side of the loader. As shown, motor 30B is controlled, and by adjusting the screw 38 and providing a new stopped position for the steering lever 16B when it is in its full forward stroke, an adjusted full speed of the motor 16B will result.

FIG. 5 is a schematic, fragmentary view showing the access opening 40 and the head of adjusted screw 38. It is thus easily accessible to an operator. It should be noted that the levers 16A and 16B return to neutral when they are released.

Figure 6:
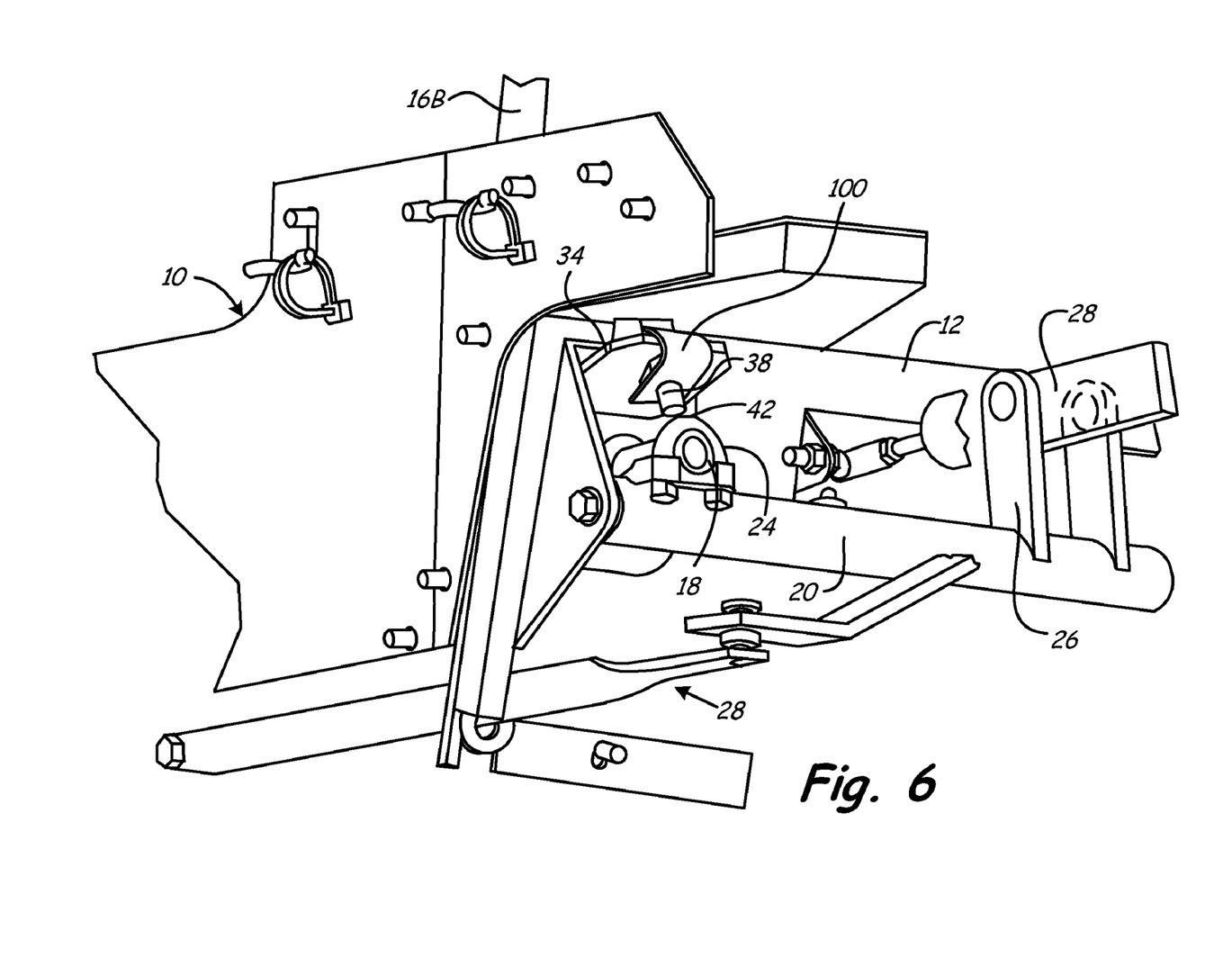
FIG. 6 is a schematic perspective view of the adjustable stop of the disclosed embodiments.

In FIG. 6, the steering lever 16B is shown fragmentarily, in relation to the platform 12, and the stop bolt 38 is engaging the flat spot 42 on the U-bolt 24. It can be seen in FIG. 4 that the arm portion 18 of the steering lever 16B is clamped in place on the bellcrank 20.

Figure 7:
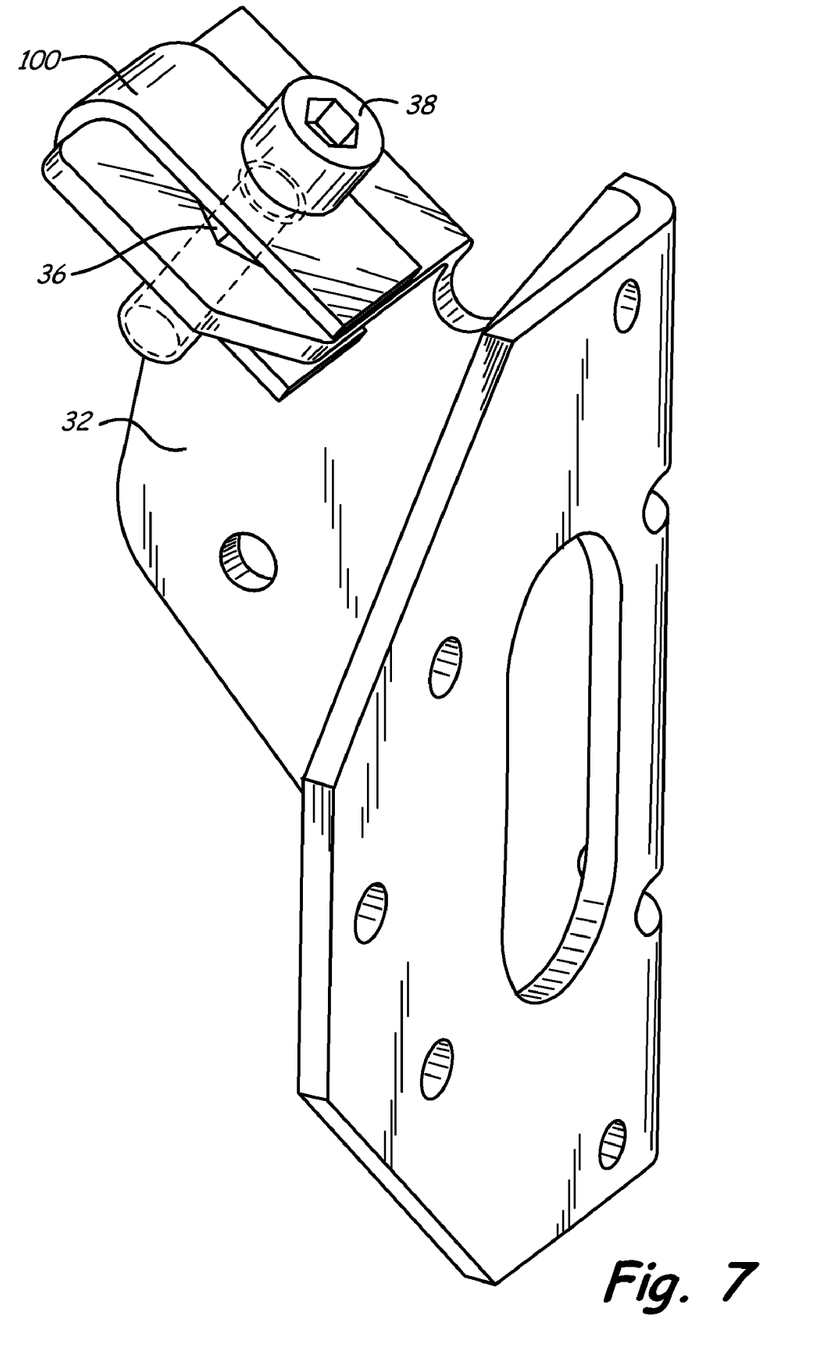
FIG. 7 is a perspective view of a steering bracket assembly showing the mounting for the adjustable stop.

In FIG. 7, a perspective view of the steering bracket assembly showing the mounting for the adjustable stop is provided. As can be seen in this perspective view, adjustment nut 36 is welded or otherwise attached to the sheet metal of steering bracket 32. The adjustment screw 38 is shown extending through the nut 36 and retaining strip 100.

Although the present invention has been described with reference to preferred embodiments, workers skilled in the art will recognize that changes may be made in form and detail without departing from the spirit and scope of the invention.

What is claimed is:

1. An adjustment device for matching speed of lever actuated variable speed drive motors on a skid steer vehicle comprising:

a bellcrank that pivots to change the speed of a drive motor,:
a control lever mounted on the bellcrank and moveable from a neutral position to a forward speed position wherein the motor is in operation at a corresponding speed;
an adjustable position stop screw accessible from an operator's compartment for engaging and stopping a moveable portion of the lever at the forward speed position;
a bracket configured to hold the stop screw in position;
an adjustment nut positioned on a lower surface of the bracket, the adjustable position stop screw extending through the bracket and the adjustment nut; and
a stretchable retaining strip engaging a first portion of the stop screw on a first side of the bracket and engaging a second portion of the stop screw to restrain rotation of the stop screw, the second portion of the stop screw extending through the adjustment nut such that the adjustment nut is positioned between the stretchable retaining strip and the bracket, wherein the retaining strip is stretched over a portion of the bracket and, as a result of the stretching, imparts restraining forces on the stop screw, at both of the first and second portions of the stop screw, to restrain rotation of the stop screw.

2. The device of claim 1 wherein the retaining strip comprises:
a first aperture;
a second aperture; and wherein the stop screw interfaces with the first aperture at the first portion and the second aperture at the second portion.

3. The adjustment device of claim 1, wherein the lever is mounted onto a bellcrank that pivots on a shaft, the bellcrank having a saddle and U-bolts for holding the lever on the bellcrank, and the stop screw being positioned to engage a closed end of a rear U-bolt when the lever is in the forward speed position.

4. The adjustment device of claim 1, wherein the forward speed position is the maximum forward speed position of the lever.

5. The adjustment device of claim 1, wherein the skid steer vehicle has an operator's platform, and the stop screw is mounted on a side of the operator's platform opposite from an operator; and the stop screw being positioned adjacent an opening in the platform and accessible from the operator's side of the platform.

6. The adjustment device of claim 5, wherein the control lever extends through an opening into the operator's compartment, and is accessible to an operator from the compartment.

7. The adjustment device of claim 5, wherein said operator's platform has a forward panel, and the opening to access the stop screw is through the forward panel.

8. An adjustment device for a skid steer loader having drive motors on opposite sides thereof, comprising:

at least one control lever for direction at least one control lever for speed control;

the control levers having a neutral position and a full forward speed position;

an adjustable stop screw for stopping at least one of the levers in the full forward speed position;

said stop screw being positioned adjacent an operator compartment platform;

the platform having an opening aligning with the stop screw so the stop screw is accessible from an interior of an operator's platform;

a bracket configured to hold the stop screw in position;

an adjustment nut positioned on a lower surface of the bracket, the stop screw extending through the bracket and the adjustment nut;

a stretchable retaining strip contacting the stop screw at a first position and at a second position, the first position being on a first side of the bracket and the second position being on a second side of the bracket, the stop screw extending through the bracket and the adjustment nut such that the adjustment nut is positioned between the stretchable retaining strip and the bracket; and wherein the retaining strip is stretched over a portion of the bracket and, as a result of the stretching, imparts forces on the stop screw, at both the first and second positions of the stop screw, that impedes rotation of the stop screw.

9. The adjustment device of claim 8, wherein said stop screw is mounted on the bracket and the bracket is positioned adjacent a movable portion of the lever with which it is associated, wherein the stop screw is threadable through the bracket along an axis of the screw toward and away from a portion of the lever.

10. The adjustment device of claim 9 wherein the retaining strip comprises:

two holes, wherein one aperture interacts with the first portion of the stop screw, and the other aperture interacts with the second portion.

11. The adjustment device of claim 9, wherein said portion of the lever comprises a clamping U-bolt that clamps the lever to a bellcrank that pivots around a shaft.

* * * * *